United States Patent
Nicholson et al.

(10) Patent No.: US 12,260,559 B2
(45) Date of Patent: Mar. 25, 2025

(54) IMAGE ALTERATION SYSTEM AND METHOD

(71) Applicant: LENOVO (SINGAPORE) PTE. LTD, New Tech Park (SG)

(72) Inventors: John W. Nicholson, Cary, NC (US); Daryl C. Cromer, Raleigh, NC (US); Howard Locker, Cary, NC (US)

(73) Assignee: LENOVO (SINGAPORE) PTE. LTD, New Tech Park (SG)

( * ) Notice: Subject to any disclaimer, the term of this patent is extended or adjusted under 35 U.S.C. 154(b) by 390 days.

(21) Appl. No.: 17/656,760

(22) Filed: Mar. 28, 2022

(65) Prior Publication Data
US 2023/0306610 A1    Sep. 28, 2023

(51) Int. Cl.
*G06T 7/194* (2017.01)
*G06T 5/50* (2006.01)
*G06T 11/60* (2006.01)

(52) U.S. Cl.
CPC .............. *G06T 7/194* (2017.01); *G06T 5/50* (2013.01); *G06T 11/60* (2013.01); *G06T 2207/20221* (2013.01)

(58) Field of Classification Search
CPC . G06T 11/00; G06T 7/194; G06T 5/50; G06T 11/60; G06T 2207/20221; G06T 5/00
See application file for complete search history.

(56) References Cited

U.S. PATENT DOCUMENTS

| | | | |
|---|---|---|---|
| 2018/0012333 A1* | 1/2018 | Urban | G11B 27/034 |
| 2019/0325243 A1* | 10/2019 | Sikka | G06V 10/267 |
| 2021/0385412 A1* | 12/2021 | Matula | H04N 7/15 |
| 2022/0058395 A1* | 2/2022 | Takahashi | G06T 7/00 |

OTHER PUBLICATIONS

Zoom guide for students | ara. (Apr. 19, 2020). https://www.ara.ac.nz/siteassets/documents---home/news-and-events/news-stories/covid-pdfs/zoom-guide-for-students.pdf (Year: 2020).*

* cited by examiner

*Primary Examiner* — Gregory A Morse
*Assistant Examiner* — David Alexander Wambst
(74) *Attorney, Agent, or Firm* — Dean D. Small; The Small Patent Law Group, LLC

(57) ABSTRACT

An image alteration system includes a memory and one or more processors. The processors receive input image data that depicts a background environment, and segment the input image data to locate objects depicted in the background environment. The processors identify a set of one or more of the objects to modify, and generate output image data that depicts a modified version of the background environment for display on a display device. The processors change an appearance of the one or more objects in the set as depicted in the output image data, relative to the appearance of the one or more objects as depicted in the input image data, without changing an appearance of one of more other objects located in the background environment. The input image data and the output image data represent video streams.

19 Claims, 5 Drawing Sheets

IMAGE ALTERATION SYSTEM AND METHOD

FIELD

The present disclosure generally relates to altering image data, such as image data for video conferencing.

BACKGROUND OF THE INVENTION

During video conference calls, personal items and areas of a user may be visible in the background of the camera feed that is transmitted from the user's computer to other participants on the call. Examples of personal items can include family photos, paintings, books, notes, light fixtures, objects on shelves, and the like. Personal areas can include hallways, windows (and the environment outside of the windows), doorways, and the like. The user may not feel comfortable disclosing some of the personal items to the other participants based on the content of the personal items and/or a relationship between the user and the other participants on the call. For example, the personal items may reveal private information about the user or the user's family, the personal items may not be inline with a persona that the user would like to present to the other participants on the call, and/or the user may simply want to avoid providing personal information to the other participants on the call. This issue of inadvertent disclosing of personal information in the background of a video conference call is exacerbated as camera devices are made with increasing resolutions and wider fields of view. The issue is particularly relevant for users that participate in video conference calls while working from home, as the user's home environment may have more personal elements and may be less curated for business interactions than an office environment.

Some known video conferencing systems address this issue on a global scale by enabling a user to blur or replace the entire background environment. For example, a video conferencing system may segment the foreground portion of image data in a camera feed from the background portion. The user can select for the background portion to be blurred, which makes the background indistinct and hazy such that a participant on the call is not able to identify any particular items or areas in the background of the user. The user alternatively may select a replacement image to make it appear as if the user in the foreground is located at a different location than the actual location of the user. For example, the user may be sitting in front of a computer in a home office, and the replacement image may be a beach environment to make it appear, at least generally, as if the user is on the beach. A need remains for allowing a user to conceal select personal items and areas in the background environment of a camera feed without requiring the user to blur or replace the entire background environment.

SUMMARY

In accordance with an embodiment, an image alteration system is provided that includes a memory configured to store program instructions, and one or more processors operably connected to the memory. The program instructions are executable by the one or more processors to receive input image data that depicts a background environment, and to segment the input image data to locate objects depicted in the background environment. The program instructions are executable by the one or more processors to identify a set of one or more of the objects to modify, and to generate output image data that depicts a modified version of the background environment for display on a display device. The one or more processors are configured to change an appearance of the one or more objects in the set as depicted in the output image data, relative to the appearance of the one or more objects as depicted in the input image data, without changing an appearance of one of more other objects located in the background environment. The input image data and the output image data represent video streams.

Optionally, the one or more processors are configured to change the appearance of the one or more objects in the set by blurring at least a first object in the set. The one or more processors may blur the first object by obscuring the appearance of the first object at one of multiple different concealment levels based on a blur strength parameter.

Optionally, the one or more processors are configured to change the appearance of the one or more objects in the set by replacing at least a first object in the set with a replacement object such that the replacement object is depicted in the output image data in place of the first object. The replacement object may have a different appearance than the first object. The one or more processors may retrieve the replacement object from a library of stock objects. The library may be stored on the memory or another data storage device that is operably connected to the one or more processors.

Optionally, the one or more processors may be configured to change the appearance of the one or more objects in the set by omitting at least a first object in the set from depiction in the modified version of the background environment, and generating new image data to fill a space in the background environment corresponding to a location of the first object. The one or more processors may generate the new image data to fill the space by extrapolating a content of the background environment surrounding the space to extend into the space.

Optionally, the one or more processors may be configured to identify the set of one or more objects to modify based on designated settings of a user profile stored on the memory or another data storage device that is operably connected to the one or more processors. Optionally, the image alteration system may include the display device and an input device that are operably connected to the one or more processors. The one or more processors may identify the set of one or more objects to modify based on user input selections generated via the input device while the display device is controlled to display the input image data. The one or more processors may control the display device to display the input image data superimposed with graphic indicators that indicate the objects in the background environment that are segmented by the one or more processors.

Optionally, the program instructions may be further executable by the one or more processors to receive updated image data that depicts the background environment and is generated at a subsequent time relative to the input image data; segment the updated image data to locate objects depicted in the background environment; determine a discrepancy between the objects located in the updated image data and the objects located in the input image data; and generate a control signal to notify a user about the discrepancy. The discrepancy may include a new object depicted in the updated image data and not depicted in the input image data. The one or more processors may generate the control signal to prompt the user to select whether to modify the new object for depiction in updated output image data. Optionally, the image alteration system may further include a communication device operably connected to the one or more processors and controlled by the one or more processors to transmit the output image data via a network to a remote computer device in real time during a video conference.

In accordance with an embodiment, a method is provided that includes receiving input image data that depicts a background environment, and segmenting, via one or more processors, the input image data to locate objects depicted in the background environment. The method includes identifying a set of one or more of the objects to modify, and generating output image data that depicts a modified version of the background environment for display on a display device. Generating the output image data may include changing an appearance of the one or more objects in the set, relative to the appearance of the one or more objects as depicted in the input image data, without changing an appearance of one of more other objects located in the background environment as depicted in the input image data. The input image data and the output image data may represent video streams.

In accordance with an embodiment, a computer program product is provided that includes a non-transitory computer readable storage medium. The non-transitory computer readable storage medium includes computer executable code configured to be executed by one or more processors to receive input image data that depicts a background environment, and segment the input image data to locate objects depicted in the background environment. The computer executable code is configured to be executed by one or more processors to identify a set of one or more of the objects to modify, and to generate output image data that depicts a modified version of the background environment for display on a display device. The one or more processors may change an appearance of the one or more objects in the set as depicted in the output image data, relative to the appearance of the one or more objects as depicted in the input image data, without changing an appearance of one of more other objects located in the background environment. The input image data and the output image data may represent video streams.

DETAILED DESCRIPTION

Figure 1:
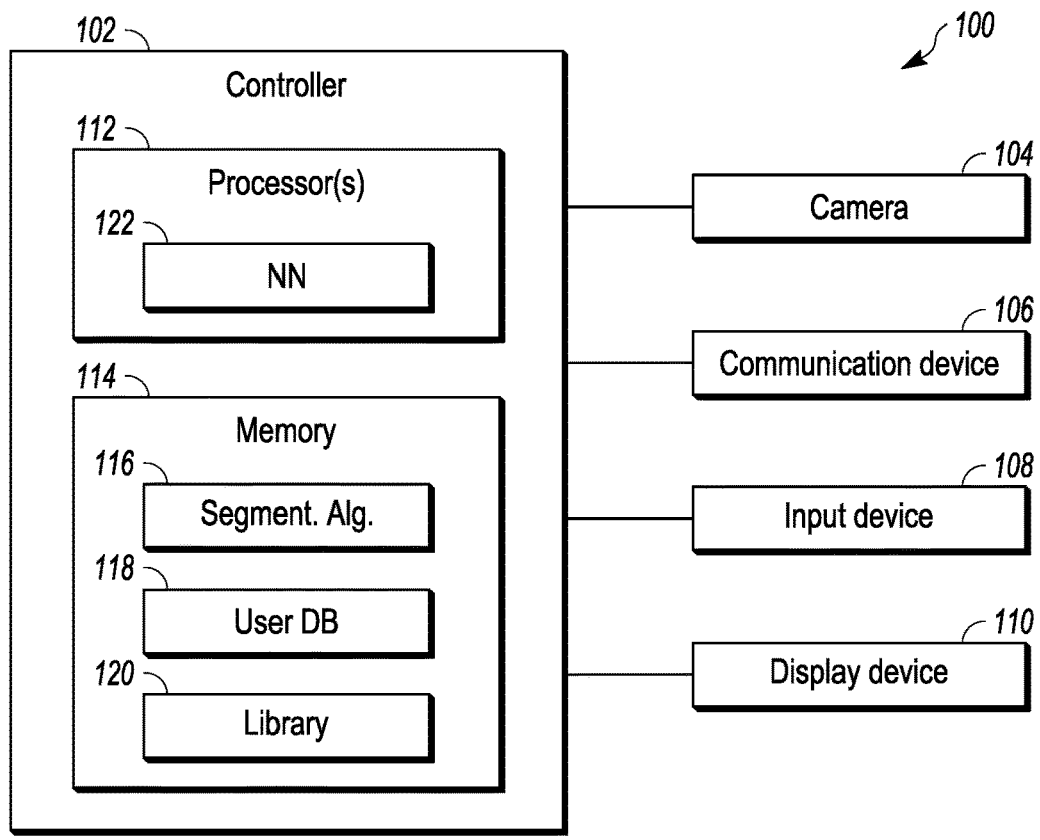
FIG. 1 is a block diagram of an image alteration system according to an embodiment.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Embodiments described herein disclose an image alteration system that segments a background environment depicted in input image data and modifies some objects in the background environment without modifying other objects in the background environment. The input image data may be one or more image frames of a video stream that is generated by a camera. The camera may be fixed in place, such that the background environment remains generally static during the video stream. The system may output image data depicting a modified version of the background environment. The modified version of the background environment depicts a changed appearance of the objects that are modified, without changing the appearance of the objects that are not modified. The input image data may include a foreground environment in front of the background environment. The foreground environment may include one or more subjects, such as one or more people. The system disclosed herein may generate the output image data to include the foreground environment without modifying the appearance of the foreground environment. As such, the output image data may be visually similar to the input image data except for changes made to a set of one or more objects in the background environment.

The image alteration system and method disclosed herein is designed to allow a user to customize and curate the background environment. The system segments a background environment within a camera field of view into multiple objects. The system may determine, either autonomously or through user input, which portions of the background environment to leave as is and which portions of the background environment to modify. Thus, the system enables a user to select, on an object-by-object basis, which objects the user would like to conceal from the outgoing image data without requiring the user to blur or replace the entire background environment with a stock background. The image data produced by the system may resemble the user's actual room or space except for the select objects modified. The system can successfully conceal personal and private aspects visible in the background of a camera view, without substantially changing the image aesthetics.

In an example use application, the system is used during video conference calls. For example, a first user may interact with the system to customize and curate the background environment behind the first user, as captured within a field of view of a camera. The first user may modify objects that are personal or private by choosing to blur, remove, or replace those objects. The system generates output image data that changes the appearance of the objects selected for modification in the background environment. The output image data may be transmitted to one or more remote computer devices utilized by other users participating in the conference call. For example, if the first user selects to blur a family photo, then the video stream showing the first user that is received and displayed on the remote computer devices during the conference call shows a blurred image of the family photo without blurring other portions of the background surrounding the family photo. The users conversing with the first user can see the first user in the foreground, and can see a modified version of the first user's background environment generated by the background alteration system. It is possible that the other users may not even notice that the background of the user's video stream has been modified. The image alteration system and method disclosed herein is not limited to video conferencing call applications.

The term "object" as used herein can refer to items, architectural elements, areas of a space defined between items and/or architectural elements, and/or the like. The items may include books, photographs, electronic devices, papers, posters, paintings, signs, light fixtures, lamps, furniture, and the like. The architectural elements may include windows, doorframes, walls, shelves, and/or the like. The areas between items and/or architectural elements may include a hallway and/or a doorway that shows a portion of another room visible in the background environment, and the like.

References herein to "machine learning" and "artificial intelligence" refer to algorithms that learn from various automatic or manual feedback, such as observations and/or data. The artificial intelligence algorithms may be adjusted over multiple iterations based on the observations and/or data. For example, the artificial intelligence algorithms may be adjusted by supervised learning, unsupervised learning, and/or reinforcement learning (e.g., customer feedback). Non-limiting examples of artificial intelligence algorithms include decision trees, K-means, deep learning, artificial neural networks, and/or the like.

References herein to "computer device", unless specified, shall mean any of various types of hardware devices that perform processing operations, such as servers, computer workstations, personal computers (e.g., laptop, desktop, tablet, smart phone, wearable computer, etc.), standalone video conference hub devices or stations, and the like.

FIG. 1 is a block diagram of an image alteration system 100 according to an embodiment. The image alteration system 100 allows a user to selectively conceal one or more objects in the background environment of a camera feed, such as personal items, without universal blurring or replacement of the entire background environment. The image alteration system 100 includes a controller 102 that performs some or all of the operations described herein to alter the camera image data. The image alteration system 100 may also include a camera 104, a communication device 106, an input device 108, and/or a display device 110. The controller 102 is operably connected to the other components of the image alteration system 100 via wired and/or wireless communication links to permit the transmission of information in the form of signals. For example, the controller 102 may generate control signals that are transmitted to the other components to control operation of the components. The image alteration system 100 may have additional components that are not shown in FIG. 1. In an alternative embodiment, the image alteration system 100 may lack one or more of the components that are shown in FIG. 1.

The controller 102 represents hardware circuitry that includes and/or is connected with one or more processors 112 (e.g., one or more microprocessors, integrated circuits, microcontrollers, field programmable gate arrays, etc.). The controller 102 includes and/or is connected with a tangible and non-transitory computer-readable storage medium (e.g., data storage device), referred to herein as memory 114. The memory 114 may store programmed instructions (e.g., software) that are executed by the one or more processors 112 to perform the image alteration operations described herein.

The programmed instructions may include one or more algorithms utilized by the one or more processors 112. For example, one or more segmentation algorithms 116 stored in the memory 114 may be used by the processor(s) 112 to analyze received image data and segment the image data to locate objects depicted in a background environment. Another one or more algorithms may be used by the processor(s) 112 to generate output image data that depicts a modified version of the background environment, where one or more objects are concealed in the background environment. The programmed instructions may dictate actions to be performed by the one or more processors 112, such as generating messages and/or alerts to prompt a user for user input. The memory 114 may store a user database 118 that includes information about particular users of the system 100, such as user settings and/or at least one user profile. Each user profile may include a suite of user settings. The memory 114 may store a library 120 of stock images (e.g., image data) that can be used to replace an object in the background environment of the camera feed. The memory 114 may store additional applications, such as various application program interfaces (APIs) that link to cloud hosting services, via the communication device 106, for accessing information from remote storage devices, such as servers.

The camera 104 is an optical sensor that generates or captures image data representative of subject matter within a field of view of the camera 104 at the time that the image data is generated. The image data may be a series of image frames generated over time. The series of image frames may be a video. In an embodiment, the camera 104 may be fixed in place during use, such as mounted to a user computer device which is stationary on a desk while the user computer device is operated. For example, the camera 104 may be a webcam that faces towards the user of the computer device to capture the user within the field of view. With the camera 104 fixed in place, the environment that is captured in the image data may remain relatively constant except for movements within the environment. The image data generated by the camera 104 may be input image data that is conveyed to the controller 102 for processing according to the image alteration process described herein.

The communication device 106 represents hardware circuitry that can communicate electrical signals via wireless communication pathways and/or wired conductive pathways. The controller 102 may control the communication device 106 to remotely communicate audio and video. For example, during a video conference call, the communication device 106 may be used to communicate output image data from the controller 102 through a network to computer devices controlled by other participants of the video conference call. The communication device 106 may include transceiving circuitry, one or more antennas, and the like, for wireless communication. The communication device 106 may communicate with a cellular tower, a modem, a router, and/or the like.

The input device 108 is designed to receive user inputs (e.g., selections) from a user that interacts with the image alteration system 100. The input device 108 may include or represent a touch sensitive screen or pad, a mouse, a keyboard, a joystick, a switch, physical buttons, and/or the like. The user may actuate the input device 108 to generate input signals that are conveyed to the controller 102. The input signals may represent information and/or commands for operation of the image alteration system 100.

The display device 110 includes a display screen that presents graphical indicia, such as text and symbols, for viewing by the user. The display device 110 may display a graphical user interface (GUI) of an application or website, such as a video conferencing platform's application or website.

Figure 2:
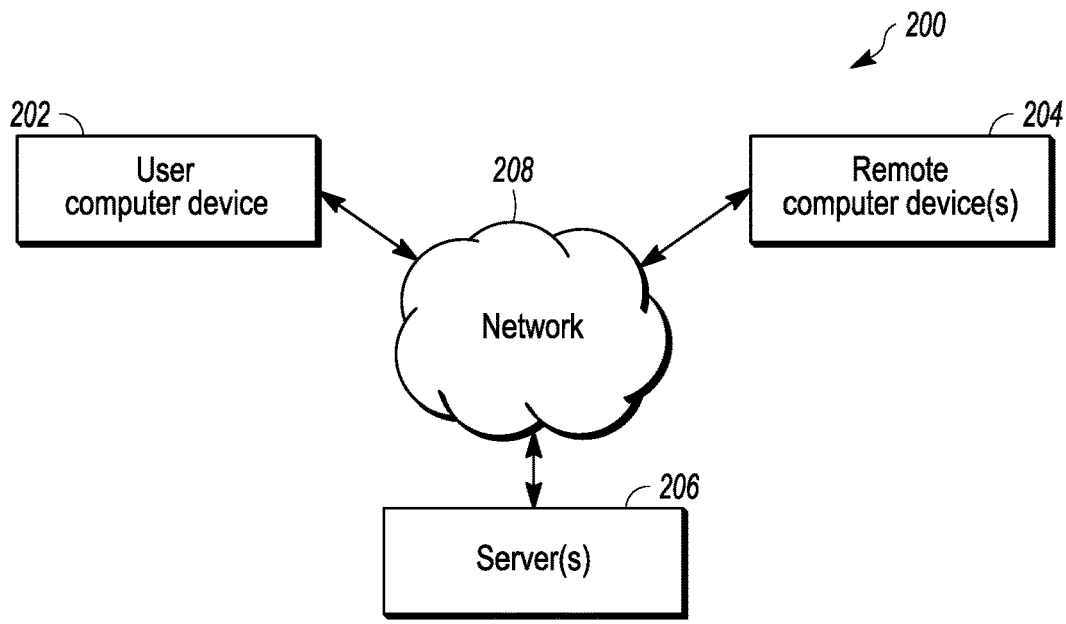
FIG. 2 is a diagram of a communication system the incorporates the image alteration system according to an embodiment.

FIG. 2 is a diagram of a communication system 200 according to an embodiment. The communication system 200 includes a user computer device 202, one or more remote computer devices 204, and one or more servers 206. The remote computer devices 204 and the servers 206 may be external and remote from the user computer device 202. For example, the servers 206 may be located at a data center. The user computer device 202 may be communicatively connected to the remote computer devices 204 and the servers 206 via a network 208. The network 208 may be the Internet, a local area network, or the like. The servers 206 may provide various cloud-based services to the user computer device 202 and/or the remote computer devices 204 via the network 208. The services may include data storage. The user computer device 202 represents a computer device that performs at least some of the operations of the image alteration system 100. The remote computer devices 204 may receive output image data that is generated by the image alteration system 100. For example, the user computer device 202 and the remote computer devices 204 may be participants in a video conference call. During the call, the user computer device 202 transmits output image data to the remove computer devices 204 via the network 208. The user computer device 202 may receive audio and/or video streams generated by the remote computer devices 204 as well.

In an embodiment, at least most of the components of the image alteration system 100 shown in FIG. 1 are disposed on or within the user computer device 202. For example, the camera 104, the communication device 106, the input device 108, and the display device 110 may be commonly held within and/or on a housing or case of the user computer device 202. The user computer device 202 may be a smartphone, a tablet computer, a laptop computer, a desktop computer, a wearable computer, or the like.

In one embodiment, the controller 102 of the image alteration system 100 is distributed between the user computer device 202 and the one or more servers 206. For example, the servers 206 may include one or more processors and one or more data storage devices (e.g., memory devices). The one or more processors 112 of the image alteration system 100 may include one or more processors of the user computer device 202 and/or one or more processors of the servers 206. Furthermore, the memory 114 of the controller 102 may include one or more data storage devices of the user computer device 202 and/or one or more data storage devices of the servers 206. For example, the segmentation algorithm 116 and the user database 118 may be locally stored onboard the user computer device 202 and the library 120 of stock images may be stored on the servers 206. The user computer device 202 accesses the library 120 from the servers 206 via the network connection 208. In an alternative embodiment, the controller 102 of the image alteration system 100 is disposed only on the user computer device 202. The user computer device 202 may contain the entire image alteration system 100, without requiring a communication link to the remote servers 206 to operate.

The image alteration system 100 may be used in conjunction with a video conferencing platform or video streaming platform. For example, the operations of the image alteration system 100 may be incorporated into the program instructions of a video conferencing or video streaming application that is downloaded onto the user computer device 202. For example, the controller 102 of the image alteration system 100 may be activated upon a user input selection to initiate the application.

Figure 3:
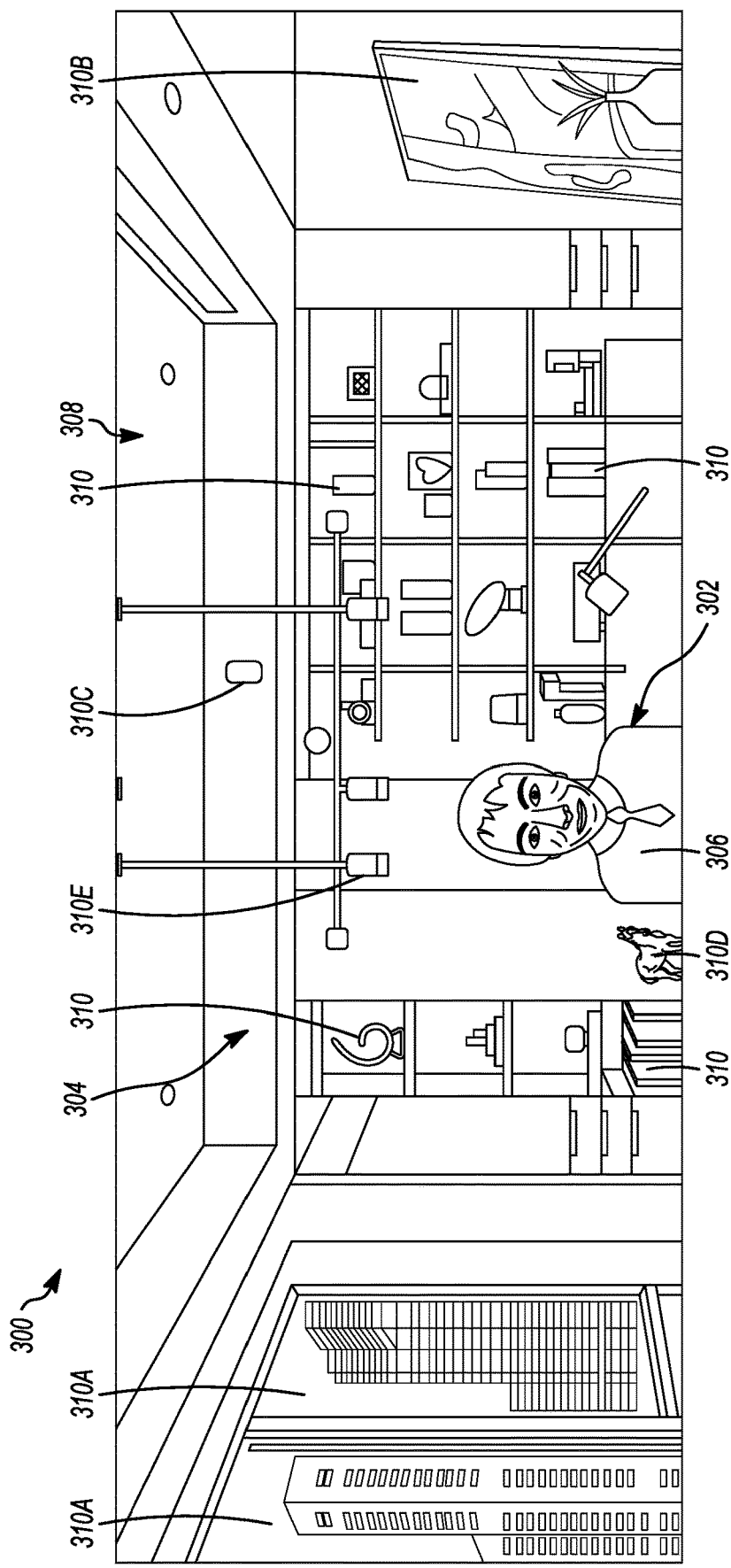
FIG. 3 illustrates an image that is based on image data received by the controller of the image alteration system according to an embodiment.

The controller 102 of the image alteration system 100 receives input image data. FIG. 3 illustrates an image 300 that is based on image data received by the controller 102 of the image alteration system 100 according to an embodiment. The image data used to generate the image 300 may be generated by the camera 104. The image data generated by the camera 104 is referred to as input image data. The image 300 may represent one frame in a series of frames that represent a video feed or stream. The image 300 in FIG. 3 depicts a foreground environment 302 and a background environment 304. The foreground environment 302 may include one or more subjects 306 disposed proximate to the camera 104. In FIG. 3, the subject 306 is the user of the user computer device 202, who is seated in front of the user computer device 202. The background environment 304 is subject matter that is behind the one or more subjects 306 and within the field of view of the camera 104. In the illustrated embodiment, the background environment 304 is a room 308. The room 308 may be within a residence, such as a living room or home office. Alternatively, the room 308 may be within a commercial office building.

In an embodiment, the controller 102 analyzes and segments the received input image data. For example, the controller 102 may perform a first segmentation to differentiate the foreground environment 302 from the background environment 304. The controller 102 may perform a second segmentation to locate objects 310 in the background environment 304. The second segmentation may be performed on only the image data that is identified as depicting the background environment 304. The one or more processors 112 may perform the segmentations based on the segmentation algorithm or algorithms 116 stored in the memory 114. The segmentation operations may involve edge detection, boundary analysis, and/or the like. Segmentation may detect the location of objects 310, with or without identifying the class or type of the objects 310. For example, the controller 102 may determine, based on the segmentation, that a curved feature is disposed directly about a horizontal line in the image data, and the controller 102 may predict that the curved feature represents an object 310 laying on a shelf, table, or the like.

In an embodiment, the controller 102 attempts to recognize and identify the type or class of the objects 310 in the image data during the image segmentation. The controller 102 may use machine learning (e.g., artificial intelligence). For example, the one or more processors 112 may include an artificial neural network 122 (shown in FIG. 1). The neural network 122 may be trained to perform image segmentation to identify different types of objects 310 in the background environment 304. For example, the neural network 122 may be trained to automatically detect and recognize objects 310 depicted in image data. The neural network 122 may be divided into multiple layers, such as an input layer that receives an input image, an output layer that outputs a predicted classification or segmentation, and one or more intermediate layers between the input and the output layers. The layers may represent different groups or sets of artificial neurons or nodes, which are functions performed to identify objects in the input image. The artificial neurons may apply different weights in the functions applied to the input image to attempt to identify or segment the objects in the input image.

The neurons in the layers of the neural network 122 may examine characteristics of the pixels of the input image, such as the intensities, colors, or the like, to determine the classification vectors for the various pixels. The neural network 122 may assign or associate different pixels with different object classes based on the characteristics of the pixels. An object class is a type or category of an object 310 appearing in the image 300. For example, a window can be a first object class, a wall can be a different, second object class, a framed painting or photograph can be a third object class, and objects on shelves, such as books, can be a fourth object class. A pixel can be labeled (e.g., associated) with probabilities, confidence levels, or scores that the pixel represents various different object classes by a vector [a b c d], where the values of a, b, c, and d indicate the probability, confidence level, or score of the pixel representing each of different classes of objects or things.

The neural network 122 may examine the classification vector of each pixel and determine which object class has the highest confidence or score for each pixel. For example, a first pixel in the input image 300 having a classification vector of [0.6 0.15 0.05 0.2] indicates that the neural network 122 calculated a 60% confidence that the first pixel represents a first object class, a 15% confidence that the first pixel represents a second object class, a 5% confidence that the first pixel represents a third object class, and a 20% confidence that the first pixel represents a fourth object class. The neural network 122 may determine that each pixel in the image 300 represents the object class having the greatest or largest confidence level or score in the corresponding classification vector for that pixel. For example, the neural network 122 may determine that the first pixel described above represents a window due to the 60% confidence. This process can be repeated for several, or all, other pixels in the input image data.

After the segmentation of the input image data, the controller 102 may identify a set of one or more of the objects 310 in the background environment 304 to modify. For example, some of the objects 310 may be deemed by the user as too personal or private, or simply not appropriate for the tenor of the video conference call. The set of objects 310 may be identified in order to conceal those objects 310 from view by persons that view the video stream showing the room 308.

Figure 4:
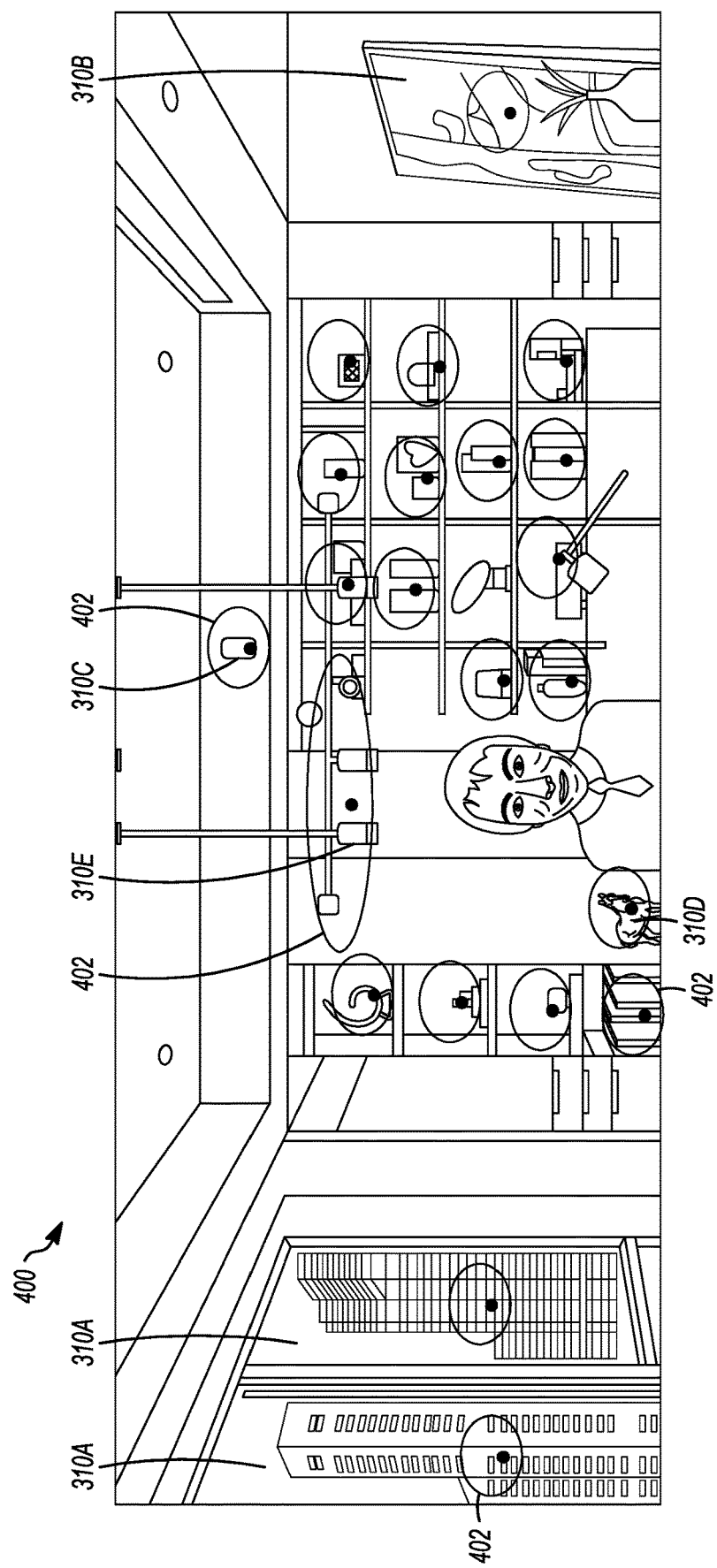
FIG. 4 illustrates an annotated image that is generated by the controller of the image alteration system according to an embodiment.

FIG. 4 illustrates an annotated image 400 that is generated by the controller 102 of the image alteration system 100 according to an embodiment. In an embodiment, the controller 102 prompts the user to select the set of objects 310 to modify. For example, the controller 102 may control the display device 110 to display the annotated image 400 for viewing by the user. The annotated imaged 400 may represent the image 300 shown in FIG. 3 (and based on the input image data) superimposed with graphic indicators 402. The graphic indicators 402 indicate the objects 310 in the background environment 304 that were located via the image analysis and segmentation process. The indicators 402 are illustrated in FIG. 4 as ovals or ellipses positioned to overlap and/or surround the corresponding objects 310. The ovals or ellipses may have unfilled or transparent interior areas to enable the user to see which object 310 is surrounded and/or overlapped by each indicator 402. In other embodiments, the indicators 402 may have a different shape or characteristic. For example, the indicators 402 may be closed shapes that outline the objects 310 by extending along the perimeter contours of the objects 310. The indicators 402 may be bold outlines that draw the user's attention. In another example, the indicators 402 may brighten the pixels that correspond to the objects 310 relative to pixels that do not correspond to the objects 310. In other examples, the indicators 402 may show the objects 310 shaking or highlighted, such as with a halo surrounding each object 310.

In an embodiment, the user may select, via the input device 108, one or more of the graphic indicators 402 and/or objects 310 to set a status for the selected objects 310 as "keep" or "modify". If the user desires to conceal a first object 310, then the user may control the input device 108 to provide a user input selection of the graphic indicator 402 associated with the first object 310. For example, the user may "click" on the graphic indicator 402 associated with the first object 310 using the input device 108. In response to receiving the user input selection, the controller 102 may generate a graphical dialog box that is displayed on the display device 110. The graphical dialog box may prompt the user to select whether to keep the first object 310 in the background environment 304 or to modify the first object 310 to conceal the first object 310 within the video feed that is remotely communicated. The controller 102 modifies the objects 310 that are identified for modification by changing the appearance of those objects 310 in output image data, relative to the appearance of those objects 310 in the input image data. The controller 102 may not modify the appearance of the objects 310 that are not identified for modification. After setting the status of the first object 310, the user may select another graphic indicator 402 to set the status of another one of the objects 310, if desired. In an embodiment, the default setting for the objects 310 may be to keep as is, unless the user changes the status.

In an embodiment, the controller 102 may display the annotated image 400 during a set-up or preview stage before the video feed generated by the camera 104 is remotely transmitted. For example, upon initiating a video conference application on the user computer device 202, the controller 102 may present the annotated image 400 to the user prior to joining the meeting. In another example, the user may select, via the input device 108, to update user settings. In response to the selection to update user settings, the controller 102 may display the annotated image 400 to enable the user to set the status of the objects 310. Once the statuses for the objects 310 are set, the controller 102 may save the object statuses as a user profile. For a subsequent streaming event (e.g., video conference call), the user may simply select the user profile from a list of profiles, and the controller 102 accesses the object statues from the user database 118 of the memory 114. The user may set multiple different profiles which have different objects 310 modified and/or the same objects 310 modified but in a different way. For example, the user may set one profile for work video conference meetings, a second profile for video conferences with extended family, and a third profile for video conferences with friends. The image alteration system 100 enables the user to curate the particular objects 310 shown in the background environment 304 for each of the different types of video streaming events. The profiles represent short cuts that allows the user to quickly access a pre-selected ensemble of object appearance changes, without setting individual object statuses. For example, if the controller 102 receives a command to implement a specific user profile, then after segmenting the input image data, the controller 102 identifies the set of one or more objects 310 to modify based on the designated settings in the selected user profile.

In an alternative embodiment, rather than displaying graphic indicators 402, the controller 102 may display the input image data (e.g., the image 300) to the user and allow the user to select which objects 310 to modify. For example, the user may view the input image 300 and use the input device 108 to generate user input selections, picking out specific objects 310 to modify, without being shown the indicators 402. The controller 102 may identify the set of objects 310 to modify based on the user input selections.

In an embodiment, when the user decides to modify an object 310, the controller 102 may provide options for how the user would like to conceal the particular object 310. For example, the controller 102 may provide different modes of concealment. The modes may include blurring, extraction (or removal), replacement, and/or the like.

Figure 5:
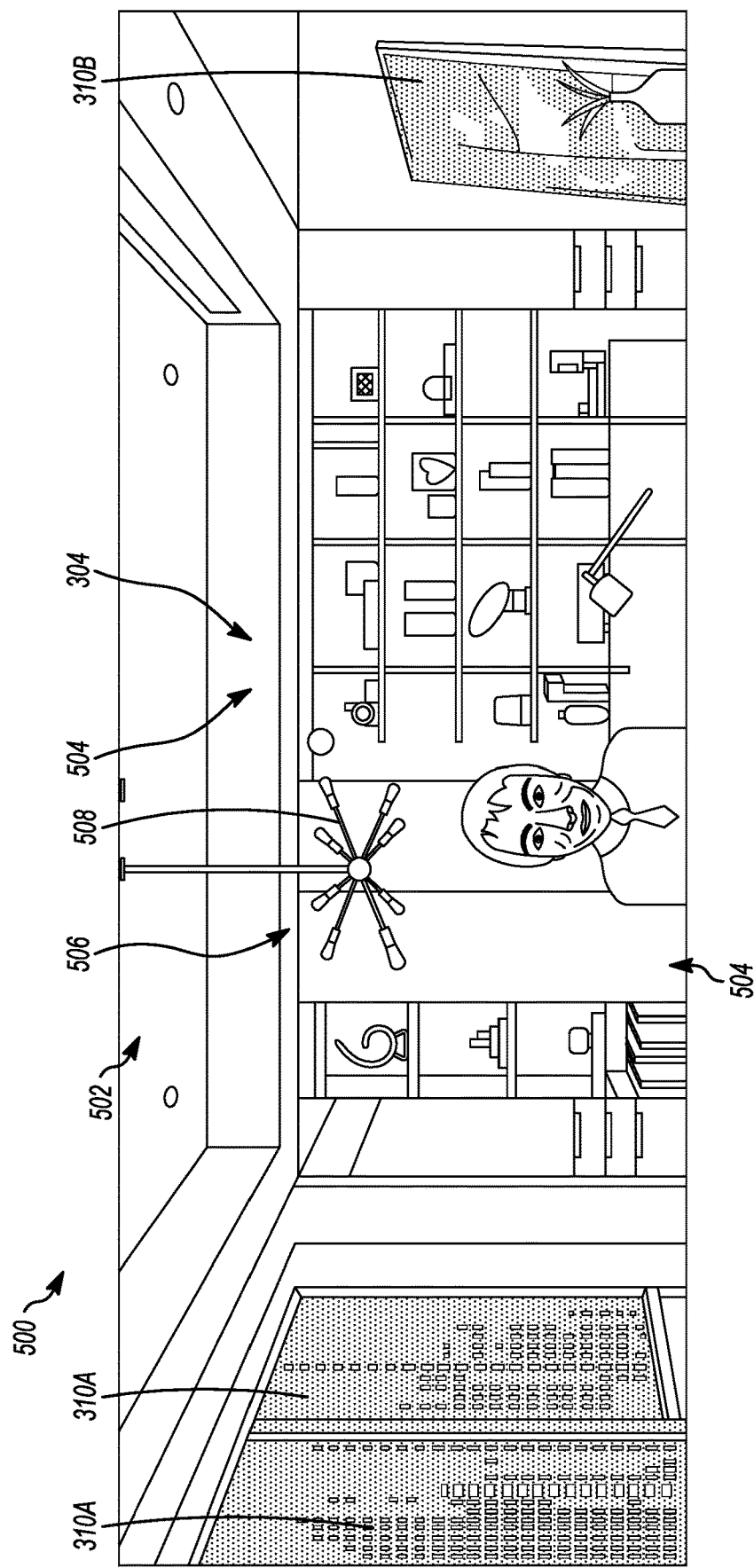
FIG. 5. illustrates an output image that is based on image data generated by the controller of the image alteration system according to an embodiment.

FIG. 5 illustrates an output image 500 that is based on image data generated by the controller 102 of the image alteration system 100 according to an embodiment. The image data generated by the controller 102 is referred to herein as output image data. The output image 500 depicts a modified version 502 of the background environment 304. The output image 500 (e.g., output image data) represents the background portion of the image data that is remotely transmitted during the video streaming event. As such, a participant in a video conference using one of the remote computer devices 204 would view the output image 500 shown in FIG. 5, rather than the input image 300 that is shown in FIG. 3 and the annotated image 400 shown in FIG. 4. The controller 102 generates the output image data by changing the appearance of the objects 310 that are identified for modification. The appearance change may be based on the mode of concealment selected for each of the objects 310 identified for modification.

With respect to the blurring mode, the controller 102 may blur an object 310 by obscuring the appearance of the object 310. The object 310 may be obscured by reducing the pixel resolution, modifying some of the pixels that depict the object 310, or superimposing a stock blur image over the pixels that depict the object 310. Optionally, the controller 102 may blur the object 310 at one of multiple different concealment levels based on a blur strength parameter. For example, upon the user selecting to blur an object 310, via the input device 108, the controller 102 may prompt the user to select the blur strength parameter, which indicates a level at which the object's appearance is obscured. The different concealment levels may gradually increase the amount of obscuration. A first concealment level of blur applied to a set of books may show the outline and colors of the books, allowing a viewer to discern that the object include books, but preventing the viewer from determining which specific books are present. Another concealment level of blur may essentially cover the books with a blur image, which may prevent a viewer from discerning that the object includes books.

In FIG. 4, the objects 310 that are selected for blurring may include the windows 310A and the painting 310B opposite the windows 310A. As shown in FIG. 5, the windows 310A and the painting 310B are blurred. The viewer is not able to discern and identify the buildings or other environment through the windows 310A, and the viewer is not able to identify the subject matter shown in the painting 310B.

The extraction mode may involve the controller 102 omitting the object 310 from depiction in the output image data (e.g., the output image 500). The pixels that depict the object 310, as determined by the segmentation of the background environment 304, may be changed by the controller 102 to constructively erase the presence of the object 310 from the background environment 304. In an embodiment, the controller 102 may generate new image data to fill the space in the background environment 304 that corresponds to the location of the object 310 that is extracted. For example, the controller 102 may extrapolate the content of the background environment 304 surrounding the space, such that the content continues into the space and fills the space. In an embodiment, if the object 310 to be extracted is surrounds by pixels having approximately the same color, then the controller 102 may simply fill in the space by adding pixels of that same color. Furthermore, if there is a line or edge that appears to intersect the space based on pixel characteristics on two opposite sides of the space, the controller 102 may add pixels of the same color as the line or edge to linearly connect the pixels on either side of the space and form a straight line extending across the space. Optionally, the controller 102 may include or use a neural network or other machine learning, artificial intelligence algorithms to intelligently fill the space formed by the extracted object 310.

In FIG. 4, the objects 310 that are selected for extraction may include a home security camera 310C and a horse sculpture 310D. Both the home security camera 310C and the horse sculpture 310D are omitted in the modified version 502 of the background environment 304 shown in FIG. 5. The spaces 504 previously occupied by these objects 310C, 310D are filled with pixels that match the respective surrounding areas.

The replacement mode may involve the controller 102 replacing the object 310 with a replacement object 506 such that the replacement object 506 is depicted in the output image data in the output image data (e.g., the output image 500). The replacement object 506 has a different appearance than the object 310 that is replaced. Optionally, the replacement object may be disposed within the library 120 of stock object images. The library 120 may be stored in the memory 114 and/or another data storage device that is operably connected to the one or more processors 112. In an embodiment, in response to the user selecting to replace a given object 310 when setting the status for the object, the controller 102 may access the library 120 and display to the user a list of stock objects that can replace the object 310. The stock objects in the library 120 may be categorized based on type, size, and/or the like. The user may select the stock object to replace the given object 310 via the input device 108.

In FIG. 4, the object 310 that is selected for replacement may include a light fixture 310E. The replacement object 506 that is selected for the light fixture 310E is a replacement light fixture 508 in FIG. 5. The controller 102 generates the modified version 502 of the background environment 304 to depict the replacement light fixture 508 in lieu of the actual light fixture 310E that is present in the room 308.

The set of objects 310 that are modified may differ for different audiences of the streaming event. For example, a "work" profile may replace a family picture with a stock inspirational poster, may replace family photo albums with stock images of textbooks, and/or the like.

During the streaming event, such as a video conference call, the controller controls the communication device 106 to transmit the output image data, such as the output image 500 shown in FIG. 5, to the one or more remote computer devices 204 via the network 208. The remote computer devices 204 are recipients of the camera feed of the user computer device 202, as modified by the image alteration system 100. The communication device 106 may be controlled to transmit the output image data in real time during a video conference which involves interactions between the user at the user computer device 202 and participants at the remote computer devices 204. The participants are not able to view the original appearance of the objects 310 that are identified for modification. The remainder of the background environment 304 may be unmodified, such that the appearance in the output image data is perceived to be accurate and unchanged.

In an example, the user may selectively modify hallways and doorways by selecting one of the modes described above. For example, a user may want to conceal hallways and doorways that show other parts of the residence or office outside of the immediate room 308. The user may select to blur, extract, or replace such portions of the input image data. For example, the user may replace a doorway with a stock doorway image that shows a beach or mountain scene in the background of the stock image. The stock doorway image would cover the actual input image data, such that a family member or co-worker within the doorway would not be depicted in the output image data.

The controller 102 may detect changes in the background environment 304 over time. For example, when the user initiates a subsequent streaming event and selects a user profile, the controller 102 may receive and analyze updated image data that depicts the background environment at the current state. The controller 102 may segment the updated image data to locate objects depicted in the background environment. The controller 102 may then compare the objects that are located in the updated image data, including the locations of the objects, to the objects and object locations in the earlier image data on which the user profile is based. If at least one new object is present in the updated image data that was not present in the earlier image data and/or at least one of the objects in the earlier image data is no longer present, then the controller may determine a discrepancy between the objects located in the updated image data and the objects located in the earlier (e.g., input) image data. Optionally, the controller 102 may also classify a discrepancy if at least one of the objects in the earlier image data has been moved to a different location. In response to determining the discrepancy in the background environment, the controller 102 may generate a control signal to notify a user about the discrepancy. For example, the controller 102 may control the display device 110 to display a notice or alert that identifies which objects are new, are missing, and/or are moved relative to the image data on which the user settings were generated. The user may then use the input device 108 to set the status of any new objects present and/or instruct the controller 102 to update the user profile based on the updated image data and updated objects present.

Figure 6:
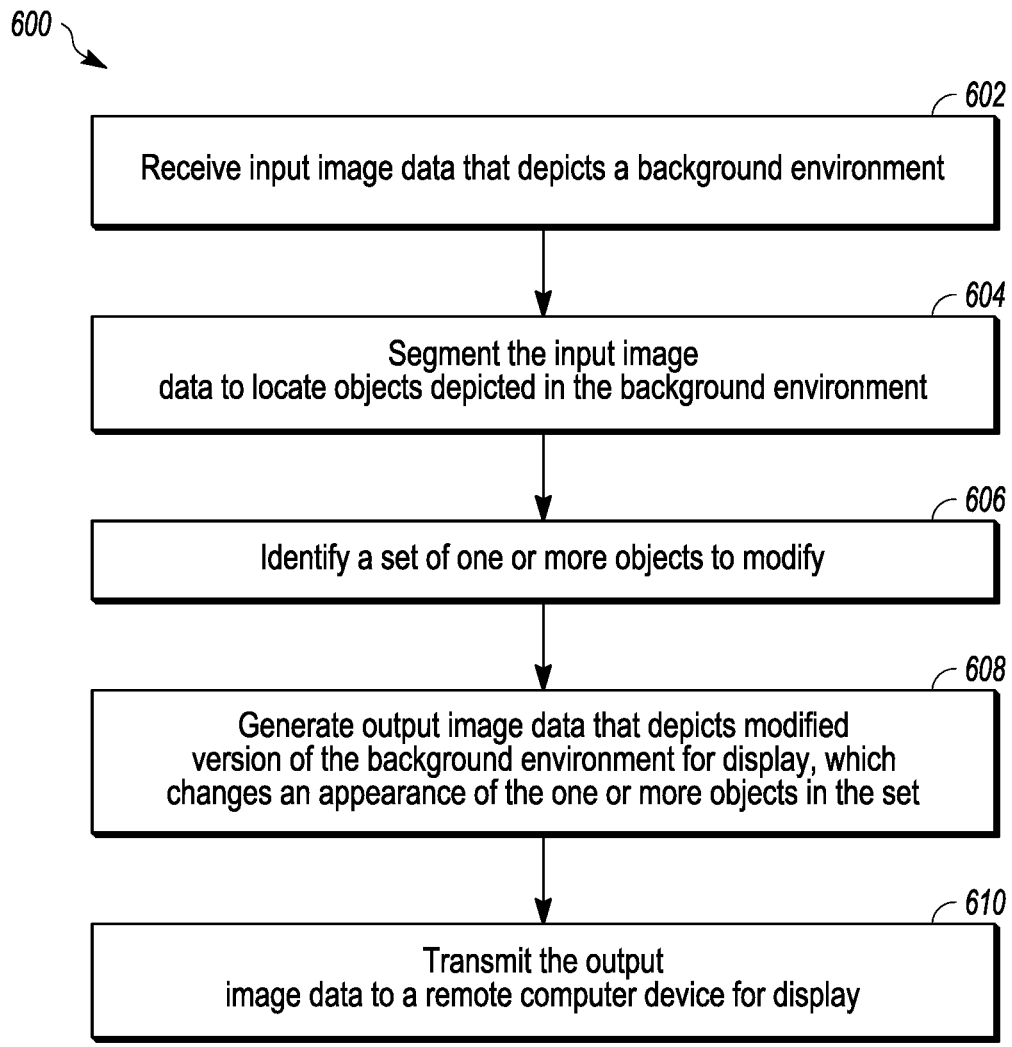
FIG. 6 is a flow chart of a method of altering a background image according to an embodiment.

FIG. 6 is a flow chart 600 of a method of altering a background image according to an embodiment. The method may be performed by the controller 102, such as the one or more processors 112 thereof. Some aspects of the method may be performed by the neural network 122 or another computer-based model. The method optionally may include at least one additional step than shown, at least one fewer step than shown, and/or at least one different step than shown.

At step 602, the controller 102 receives input image data (e.g., the image 300) that depicts a background environment 304. At step 604, the controller 102 segments the input image data to locate objects 310 depicted in the background environment 304. At step 606, the controller 102 identifies a set of one or more objects 310 to modify. Optionally, the set of objects to modify may be based on designated settings of a user profile and/or user input selections generated via an input device 108. The user profile may be stored in a memory device, such as the memory 114 of the controller 102.

At step 608, the controller 102 generates output image data (e.g., the image 500) that depicts a modified version 502 of the background environment 304 for display on a display device. The display device may be a display device 110 of the user computer device 202 and/or a display of a computer device that receives the output image data. The controller 102 may generate the output image data by changing an appearance of the one or more objects 310 in the set, relative to the appearance of the one or more objects 310 as depicted in the input image data. The controller 102 may not change the appearance of one of more other objects 310 located in the background environment 304 as depicted in the input image data.

In an embodiment, changing the appearance of the one or more objects 310 in the set may include the controller 102 blurring at least one object 310 in the set. Changing the appearance of the one or more objects 310 in the set may include the controller 102 replacing at least one object 310 in the set with a replacement object 506 such that the replacement object 506 is depicted in the output image data in place of the object 310. Changing the appearance of the one or more objects 310 in the set may include the controller 102 omitting at least one object 310 in the set from depiction in the modified version 502 of the background environment 304, and generating new image data to fill a space in the background environment 304 corresponding to a location of the object.

At step 610, the controller 102 transmits the output image data, via a network 208, to a remote computer device 204. The output image data may be transmitted in real time during a video conference or another streaming event. The controller 102 may control the communication device 106 to transmit the output image data. A recipient that views the output image data at the remote computer device 204 sees the modified version 502 of the background environment 304.

The image alteration system and method described herein allows the user to create a physical background that is customized for the audience of the video streaming event, such as a video conference call. The customization may be integrated into the existing background without universally blurring or replacing the background.

CLOSING STATEMENTS

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system."

Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the Figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally, or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Further, in the following claims, the phrases "at least A or B", "A and/or B", and "one or more of A and B" (where "A" and "B" represent claim elements), are used to encompass i) A, ii) B or iii) both A and B.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An image alteration system comprising:
a memory configured to store program instructions; and
one or more processors operably connected to the memory, wherein the one or more processors are configured to execute the program instructions to:
receive input image data that depicts a background environment;
segment the input image data to detect objects depicted in the background environment;
display the input image data on a display device of a user computer device;
receive one or more user input selections generated by an input device while the input image data is displayed on the display device, wherein each of the one or more user input selections selects a displayed location, relative to a frame of the display device, of a different corresponding one of the objects detected in the input image data;
identify a set of the objects to conceal based on the one or more user input selections; and
generate output image data that depicts a modified version of the background environment, wherein the one or more processors are configured to change an appearance of each of the objects in the set in the output image data, relative to the appearance of the respective object in the set in the input image data, without changing an appearance of the objects that are not in the set, wherein the input image data and the output image data represent video streams.

2. The image alteration system of claim 1, wherein the one or more processors are configured to blur at least a first object in the set.

3. The image alteration system of claim 2, wherein the one or more processors are configured to blur the first object by obscuring the appearance of the first object at one of multiple different concealment levels based on a blur strength parameter.

4. The image alteration system of claim 1, wherein the one or more processors are configured to replace at least a first object in the set with a replacement object such that the replacement object is depicted in the output image data in place of the first object, the replacement object having a different appearance than the first object.

5. The image alteration system of claim 4, wherein the one or more processors are configured to retrieve the replacement object from a library of stock objects, the library stored on the memory or another data storage device that is operably connected to the one or more processors.

6. The image alteration system of claim 1, wherein the one or more processors are configured to omit at least a first object in the set from depiction in the modified version of the background environment, the one or more processors configured to generate new image data to fill a space in the background environment corresponding to a location of the first object.

7. The image alteration system of claim 6, wherein the one or more processors are configured to generate the new image data to fill the space by extrapolating content of the background environment surrounding the space to extend into the space.

8. The image alteration system of claim 1, wherein the one or more processors are configured to identify the set of the objects to conceal based on designated settings of a user profile stored on the memory or another data storage device that is operably connected to the one or more processors.

9. The image alteration system of claim 1, wherein the one or more processors are configured to control the display device to display the input image data superimposed with graphic indicators that indicate the objects that are detected, and the one or more processors are configured to receive the one or more user input selections as selections of one or more of the graphic indicators that are displayed.

10. The image alteration system of claim 1, wherein the program instructions are further executable by the one or more processors to:
receive updated image data that depicts the background environment and is generated at a subsequent time relative to the input image data;
segment the updated image data to detect objects depicted in the background environment;
determine a discrepancy between the objects detected in the updated image data and the objects detected in the input image data; and
generate a control signal to notify a user about the discrepancy.

11. The image alteration system of claim 10, wherein the discrepancy includes a new object depicted in the updated image data and not depicted in the input image data, and the one or more processors are configured to generate the control signal to prompt the user to select whether to conceal the new object in updated output image data.

12. The image alteration system of claim 1, further comprising a communication device operably connected to the one or more processors, the one or more processors configured to control the communication device to transmit the output image data via a network to a remote computer device in real time during a video conference.

13. A method comprising:
receiving input image data that depicts a background environment;
segmenting, via one or more processors, the input image data to detect objects depicted in the background environment;
displaying the input image data on a display device of a user computer device;
displaying, on the display device, graphic indicators superimposed on the input image data to indicate the objects in the background environment that are detected;
receiving one or more user input selections generated by an input device while the input image data and the graphic indicators are displayed on the display device, wherein the one or more user input selections select one or more of graphic indicators that are displayed on the display device;
identifying a set of the objects to conceal based on the one or more user input selections; and
generating output image data that depicts a modified version of the background environment, wherein generating the output image data comprises changing an appearance of each object in the set, relative to the appearance of the respective object in the input image data, without changing an appearance of one of more other objects in the background environment, wherein the input image data and the output image data represent video streams.

14. The method of claim 13, wherein changing the appearance of each object in the set comprises blurring at least a first object in the set.

15. The method of claim 13, wherein changing the appearance of each object in the set comprises replacing at least a first object in the set with a replacement object such that the replacement object is depicted in the output image data in place of the first object, the replacement object having a different appearance than the first object.

16. The method of claim 13, wherein changing the appearance of each object in the set comprises omitting at least a first object in the set from depiction in the modified version of the background environment, and generating new image data to fill a space in the background environment corresponding to a location of the first object.

17. The method of claim 13, further comprising transmitting the output image data, via a network, to a remote computer device in real time during a video conference.

18. The image alteration system of claim 1, wherein the one or more processors are configured to display the input image data on the display device during a set-up stage of a video conference program, and one or more processors do not communicate image data depicting the background environment to a remote computer device during the set-up stage.

19. An image alteration system comprising:
a memory configured to store program instructions; and
one or more processors operably connected to the memory, the one or more processors configured to execute the program instructions to:
receive input image data that depicts a background environment;
segment the input image data to detect objects depicted in the background environment;
display the input image data on a display device of a user computer device;
receive one or more user input selections generated by an input device while the input image data is displayed on the display device, wherein the one or more user input selections select one or more of the objects that are detected in the input image data;
display, on the display device, a graphical dialog box in response to receiving the one or more user input selections, the graphical dialog box prompting a user to set a status of each object of the one or more objects selected by the one or more user input selections;
identify a set of the objects to conceal based on the status of each object set by the user; and
generate output image data that depicts a modified version of the background environment, wherein the one or more processors are configured to change an appearance of each of the objects in the set in the output image data, relative to the appearance of the respective object in the set in the input image data, without changing an appearance of the objects that are not in the set, wherein the input image data and the output image data represent video streams.

* * * * *